July 8, 1958     M. W. OSBORN ET AL     2,842,730

SMALL MOTOR VOLTAGE CONTROL

Filed Oct. 14, 1953

INVENTORS.
William J. Bradburn, Jr.,
Marvin W. Osborn,
Hans R. A. Hansen,
BY Wilkinson, Huxley,
Byron & Hume
Attys.

though it increases the reference voltage required to hold a given speed, it also increases the current in winding 114 to offset this and to hold speed regulation within the desired limits.

United States Patent Office 2,842,730
Patented July 8, 1958

2,842,730
SMALL MOTOR VOLTAGE CONTROL

Marvin W. Osborn and William J. Bradburn, Jr., Milwaukee, and Hans R. A. Hansen, St. Francis, Wis., assignors to The Louis Allis Co., Milwaukee, Wis., a corporation of Wisconsin Application October 14, 1953, Serial No. 385,986

3 Claims. (Cl. 318—331)

This invention relates to speed control circuits for electric motors, and more particularly to a circuit which provides an adjustable speed drive for operation on A. C. power utilizing a magnetic amplifier control circuit for a D. C. electric motor.

One of the objects of this invention is to provide an adjustable speed drive which can be operated from an A. C. power line.

Another object of this invention is to provide such a drive which has a wide speed range and good speed regulation.

Still another object is to provide such a speed drive which is low in cost and simple in both construction and operation.

Yet another object of this invention is to provide a drive of the character described which is quick in its response to load changes and is self-regulating in spite of such load changes.

Another object is to provide a circuit of the character described in which provision is made for speed drop compensation due to the IR drop in the motor, to the IR drop in the magnetic amplifier and to the change in saturation in the reactor cores from no load to full load.

Another object is to provide a control circuit which uses a variation in the voltage applied across either the armature or the field of the motor to be controlled as a means of adjusting the speed thereof.

Still another object of this invention is to utilize in the control circuit a sensing device which provides a reference voltage for use in determining whether the speed actually achieved is that which is sought by the setting of the speed control.

Further objects and advantages of this invention will become evident as the description proceeds and from an examination of the accompanying drawing which illustrates several embodiments of the invention and in which similar numerals refer to similar parts throughout the several views.

In the drawing:

Figure 1 is a circuit diagram illustrating one embodiment of the invention with some of the elements being shown somewhat diagrammatically;

Figure 2 is a diagrammatic representation of a portion of the circuit shown in Figure 1 showing how a portion of the output of the magnetic amplifier is applied to a feed back winding while a separate reference voltage is applied to a second control winding;

Figure 3 is a diagrammatic representation of a portion of the circuit shown in Figure 1, illustrating how the speed drop compensation is introduced into this circuit.

Referring now to Figure 1, a control circuit is shown therein for a D. C. motor, the speed of which is regulated by varying the voltage applied to the armature.

Although this circuit illustrates the speed of the motor being controlled by varying the magnitude of the voltage applied to the motor armature with the field voltage being held constant, it should be understood that substantially the same results can be obtained by varying the magnitude of the field voltage while holding the armature voltage constant.

More specifically, in Figure 1, the leads 138 and 140 represent a source of line voltage which is here shown as a 440 volt supply at 60 cycles per second. A step down transformer indicated generally by the numeral 142 is used as a source of reference voltage in this circuit, although, of course, other suitable means could be utilized. The primary winding 144 thereof is disposed across the lines 138 and 140 and it is adapted to convert the 440 volts to 220 volts. The line voltage is connected to the reactor windings 146 and 148 of a magnetic amplifier indicated generally by the numeral 110 through the lines 147 and 149, respectively. The reactor windings 146 and 148 of the magnetic amplifier are connected with the rectifier elements 150, 152, 154 and 156 to form a bridge-type rectifier. The lines 147 and 149 are connected to the input terminals 158 and 160 of the rectifier, while the output terminals 162 and 164 are connected by the lines 132 and 134, respectively, to the motor armature 136 so that full wave control of the armature voltage is obtained. The line 134 also has the interpole winding 166 in series therewith.

A simplified diagram showing the basic control circuit in this embodiment is shown in Fig. 2. A magnetic amplifier is shown therein indicated generally by the numeral 110. Two control windings 112 and 114 are provided, winding 112 being the feed back winding connected to the output of the magnetic amplifier through the adjustable resistor 113, and winding 114 being a control winding across which is impressed the output voltage from the potentiometer 116. The magnetic amplifier 110 is connected to the line voltage through the leads 118 and 120 and the voltage is supplied to the potentiometer 116 from the bridge-type rectifier 122, the input of which is obtained from the lines 124 and 126 connected to the lines 118 and 120, respectively. The output of the rectifier 122 is also fed to the motor field winding 126 through the lines 128 and 130. The output of the magentic amplifier is also supplied through the lines 132 and 134 to the motor armature 136.

By this arrangement, the output voltage of the magnetic amplifier fed through the potentiometer 113 is balanced against the output voltage from the potentiometer 116. The control windings are so arranged that an increase in the current in the control winding 114 connected to the potentiometer 116 tends to increase the amplifier output voltage, while the other control winding, the feed back winding 112, is arranged so that an increase in the current flow therein tends to decrease the amplifier output voltage. Assuming a certain steady condition, if the output voltage changes because of a load change, then the feed back current will change and the change in control current will have such a direction that it will tend to restore the output voltage.

Using grain oriented nickel and iron core material, the regulator illustrated in Figure 2 would maintain practically a constant output voltage. However, it is not so suitable using grain oriented, silicon steel cores since speed drop compensation must be provided in that case. As shown in Figure 1, suitable speed drop compensation may be obtained from current transformer 214, which voltage is added to that applied to the reference winding 114. This addition is accomplished by increasing the current circulated in the loop circuit, defined by terminal 198, wire 196, wire 184, resistor 182, wire 188, potentiometer 116, resistor 216, wire 204, wire 202 and terminal 200. This increased current makes wire 202 more positive and thus increases the current flow in control winding 114 in proportion to the load current in wire 147.

As previously stated, control winding 112 is supplied with a feed back voltage from the output of the magnetic amplifier one end of the winding being connected through the line 167 to the output terminal 164 thereof, previously described, and the other end of the winding 112 being connected through the line 169 to one terminal of the adjustable resistor 113. The other terminal of this resistor is connected through the line 168 to the other output terminal 162 of the magnetic amplifier.

A reference or bias voltage in this control circuit is obtained, as previously mentioned, from the bridge rectifier 122, the two input terminals 170 and 172 of which are connected to the secondary 166 of the transformer 142 by the lines 174 and 176, respectively. The output terminals 178 and 180 of the rectifier 122 and the ends of the resistance of the potentiometer 182 are connected by the lines 184 and 186, respectively. The control arm 188 of the potentiometer 182 provides a means of adjusting the amount of reference voltage normally impressed on the winding 114 from the rectifier 122. One end of the winding 114 is connected through the line 190 to the movable arm of another potentiometer 116, one end of the resistance of this potentiometer being connected to the movable control arm 188 of the potentiometer 182.

The voltage supply circuit for the winding 114 is completed through the bridge rectifier 194, which is disposed in series with the rectifier 122. The input terminals 206 and 208, of the rectifier 194 are connected through the lines 210 and 212, respectively, to the secondary 213 of the current transformer 214, the primary of the current transformer 214 being connected in series with the line 147. The line 196 connects the negative output terminal 198 of the rectifier 194 to the positive output terminal of the rectifier 122, while the positive output terminal 200 of the rectifier 194 is connected through the line 202 to the opposite end of the control winding 114.

A second branch of the circuit containing the control winding 114 is formed by the line 204 which connects one end of the winding 114 to one end of the variable resistance 216. The opposite end of the variable resistance 216 is connected by the line 218 to the end of the resistance in the potentiometer 116 opposite to that which is connected to the movable arm 188.

An equivalent circuit for the circuits just described, containing the control winding 114, is shown in Figure 3. The following description explains the novel means by which speed drop compensation is introduced into this circuit.

The magnitude of the output current of the rectifier 194 is dependent on the input current to the magnetic amplifier 110. The input current is dependent on the load on the motor 136. Therefore, the magnitude of the current from rectifier 194 is directly dependent on the amount of load on the motor. The phase relationship of the current from rectifier 194, with respect to the current caused by the reference voltage applied to rectifier 122, is dependent on the phase relationship between the input current and voltage which, in turn, is dependent on the degree of saturation of the magnetic amplifier. When the magnetic amplifier absorbs a large portion of the input voltage, there is a large amount of phase angle between the input current and voltage. This is the condition when the motor is turning at low speeds. However, when the amplifier absorbs only a small portion of the input voltage, the phase angle between the input current and voltage is comparatively smaller. This is the condition for high motor speeds. Now, referring to Figure 3, the current shown by arrow 219, at any instant, is equal to the value of either the current caused by the reference voltage applied to rectifier 122, or the current from rectifier 194, at that instant, depending on which is larger. The circuit is so designed that the average value of the current, caused by the reference voltage applied to rectifier 122, is always larger than the average current from rectifier 194. The influence of the current from rectifier 194 will, therefore, be dependent on its wave shape and time displacement from the current caused by the reference voltage applied to rectifier 122. Here, again, the circuit is so designed that it is the time displacement of the current of rectifier 122 that has the greatest effect on the current shown by arrow 219. Thus, the increase in current 219 will be greater at low speeds where more speed drop compensation is needed.

A more detailed analysis of this type of control circuit is set out in the application of two of the present applicants, Hans R. A. Hansen and William J. Bradburn, Jr., Serial No. 479,758, filed January 4, 1955, (now abandoned), which application wass assigned to the same assignee as the present application.

The movable arm of the resistor 113 and the movable arm of the potentiometer 116, which controls the speed drop compenation and bias, are ganged as indicated by the dotted line 220 so that both the speed drop compensation and bias voltages are changed with a change in the speed setting. This type of control gives a very precise compensation for the speed drop and a very accurate speed control, as indicated in the following table. The tests were carried out on a one horsepower D. C. shunt motor rated at 115 volts and 2250 R. P. M.

Table

| Approx. Speed | Percent Full Load Torque | R. P. M. | Percent Regulation |
|---|---|---|---|
| One-eighth | 6 | 241 | |
| | 25 | 242 | −0.413 |
| | 50 | 240 | +0.417 |
| | 75 | 234 | +3.13 |
| | 100 | 230 | +4.78 |
| | 125 | 216 | +11.55 |
| One-fourth | 6 | 520 | |
| | 25 | 525 | −0.952 |
| | 50 | 525 | −0.952 |
| | 75 | 520 | 0 |
| | 100 | 509 | +2.16 |
| | 125 | 492 | +5.7 |
| One-half | 6 | 908 | |
| | 25 | 930 | −2.37 |
| | 50 | 940 | −3.4 |
| | 75 | 930 | −2.37 |
| | 100 | 900 | +0.889 |
| | 125 | 860 | +5.58 |
| Three-quarter | 6 | 1,305 | |
| | 25 | 1,350 | −3.33 |
| | 50 | 1,350 | −3.33 |
| | 75 | 1,350 | −3.33 |
| | 100 | 1,320 | −1.135 |
| | 125 | 1,255 | +3.99 |
| Full load | 6 | 1,850 | |
| | 25 | 1,870 | −1.07 |
| | 50 | 1,900 | −2.63 |
| | 75 | 1,850 | 0 |
| | 100 | 1,800 | +2.78 |
| | 125 | 1,690 | +9.48 |

It is claimed:

1. In a motor control circuit for a direct current motor an internally self-saturated magnetic amplifier the output of which supplies said motor; a first rectifier providing a source of direct current voltage; a potentiometer connected to said first rectifier to provide an adjustable reference voltage; a control winding in said magnetic amplifier connected to said potentiometer; a second rectifier providing a direct current voltage proportional to the input current to said magnetic amplifier, the output terminals of said second rectifier being connected in series with said control winding and said first rectifier so that the instantaneous current in said control winding is equal to the higher of the currents produced by said first and second rectifier means; a second control winding in said magnetic amplifier; a speed-setting means for varying the voltage applied from the output terminals of said magnetic amplifier to said second control winding; means for connecting said potentiometer and said speed-setting means in ganged relation.

2. A motor control circuit adapted to supply a plurality of direct current output voltages to a direct current motor, having a shunt field winding and an armature comprising: an internally self-saturated magnetic amplifier having input terminals for alternating current, output terminals for a full wave direct current voltage, which is one of said output voltages, at least two reactor windings and rectifier means disposed in series with said reactor windings; second rectifier means with alternating current input terminals and direct current output terminals adapted to provide another of said output voltages; a control circuit for said magnetic amplifier; a control winding in said control circuit; a potentiometer having one end of the resistance and the variable arm thereof being series connected in said control circuit; said second rectifier means being connected across the resistance of said potentiometer so as to provide an adjustable reference voltage in said control circuit; a second potentiometer having one end of the resistance and the variable arm thereof series connected in said control circuit; a third rectifier means for producing a direct current voltage proportional to the load on said motor series connected in said control circuit so that the instantaneous current in said first named control winding is equal to the higher of the currents produced by said second and third rectifier means; means for applying one of said output voltages across said field winding of said motor; a second control winding connected across the output terminals of said magnetic amplifier, said control windings being disposed so that the resultant currents flowing therein act in opposition to each other with the result that when said reference voltage exceeds output voltage of said magnetic amplifier, the output of the latter is increased whereas when the output voltage of said magnetic amplifier exceeds said reference voltage, the output of said magnetic amplifier is decreased; a speed-setting means for varying the voltage applied from the output terminals of said magnetic amplifier to the input terminals of said second control winding means; and means for connecting said second potentiometer and said speed setting means in ganged relation.

3. A motor control circuit of the character described in claim 2 further characterized in that said means for producing a direct current voltage proportional to the load on said motor is a current transformer having the primary winding thereof connected in series with one of the input terminals of said magnetic amplifier.

References Cited in the file of this patent

UNITED STATES PATENTS

| | | |
|---|---|---|
| 2,455,869 | Krabbe | Dec. 7, 1948 |
| 2,554,203 | Morgan | May 22, 1951 |
| 2,558,086 | Herchenroeden | June 26, 1951 |
| 2,558,094 | King | June 26, 1951 |
| 2,675,513 | Malick | Apr. 13, 1954 |
| 2,677,088 | Malick | Apr. 27, 1954 |

FOREIGN PATENTS

| | | |
|---|---|---|
| 1,048,540 | France | Aug. 5, 1953 |

OTHER REFERENCES

Publication: "The Amplistat and Its Application," Part III from the "General Electric Review," vol. 53, Issue 10, October 1950, pp. 41–46.

Publication: "Magnetic Amplifiers in Industry," from the "Westinghouse Engineer," vol. 10, Issue 5, September 1950, pp. 201–205.